(12) United States Patent
Wada

(10) Patent No.: US 8,130,309 B2
(45) Date of Patent: Mar. 6, 2012

(54) LIGHT SPOT POSITION DETECTION DEVICE, OPTICAL DEVICE INCLUDING THE SAME, AND ELECTRONIC EQUIPMENT INCLUDING THE OPTICAL DEVICE

(75) Inventor: Hideo Wada, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 318 days.

(21) Appl. No.: 12/637,442

(22) Filed: Dec. 14, 2009

(65) Prior Publication Data

US 2010/0194942 A1 Aug. 5, 2010

(30) Foreign Application Priority Data

Feb. 3, 2009 (JP) ................ 2009-022613

(51) Int. Cl.
  *H04N 5/232* (2006.01)
  *H04N 5/222* (2006.01)
  *G03B 3/00* (2006.01)
(52) U.S. Cl. ........... 348/348; 348/349; 348/370; 396/89
(58) Field of Classification Search ............ 348/345, 348/348, 349, 356, 350, 294, 320, 322, 370, 348/371; 396/79, 89, 106, 139, 121
See application file for complete search history.

(56) References Cited

U.S. PATENT DOCUMENTS

| | | | | |
|---|---|---|---|---|
| 5,512,997 A | * | 4/1996 | Ogawa | 396/106 |
| 6,104,476 A | * | 8/2000 | Suzuki | 396/106 |
| 6,308,014 B1 | * | 10/2001 | Nonaka et al. | 396/106 |
| 6,370,262 B1 | * | 4/2002 | Kawabata | 396/121 |
| 6,765,618 B1 | * | 7/2004 | Sato | 348/348 |
| 7,538,813 B2 | * | 5/2009 | Wernersson | 348/348 |
| 7,750,970 B2 | * | 7/2010 | Ide et al. | 348/349 |

FOREIGN PATENT DOCUMENTS

| | | |
|---|---|---|
| JP | 63-290907 A | 11/1988 |
| JP | 5-280973 A | 10/1993 |
| JP | 7-225124 A | 8/1995 |
| JP | 7-225125 A | 8/1995 |
| JP | 11-337815 A | 12/1999 |
| JP | 2002-71310 A | 3/2002 |

* cited by examiner

*Primary Examiner* — Nhan T Tran
(74) *Attorney, Agent, or Firm* — Birch, Stewart, Kolasch & Birch, LLP

(57) ABSTRACT

In a light spot position detection device, in one frame of operation, under control of a control unit, pixel data obtained in a pixel section in exposure of a solid-state image sensor in synchronization with light emission of a light emitting element are added to corresponding storage portions in a memory unit, and pixel data obtained in exposure of the image sensor asynchronous to the light emission of the light emitting element are subtracted from the corresponding storage portions, to store pixel data of only signal light in the storage portions. A given number of frames of operation are repetitively performed to accumulate pixel data of only the signal light in the storage portions. The position of a light spot on the pixel section is calculated based on the pixel data of only the signal light and outputted whether the storage portions are saturated or not with the pixel data.

12 Claims, 11 Drawing Sheets

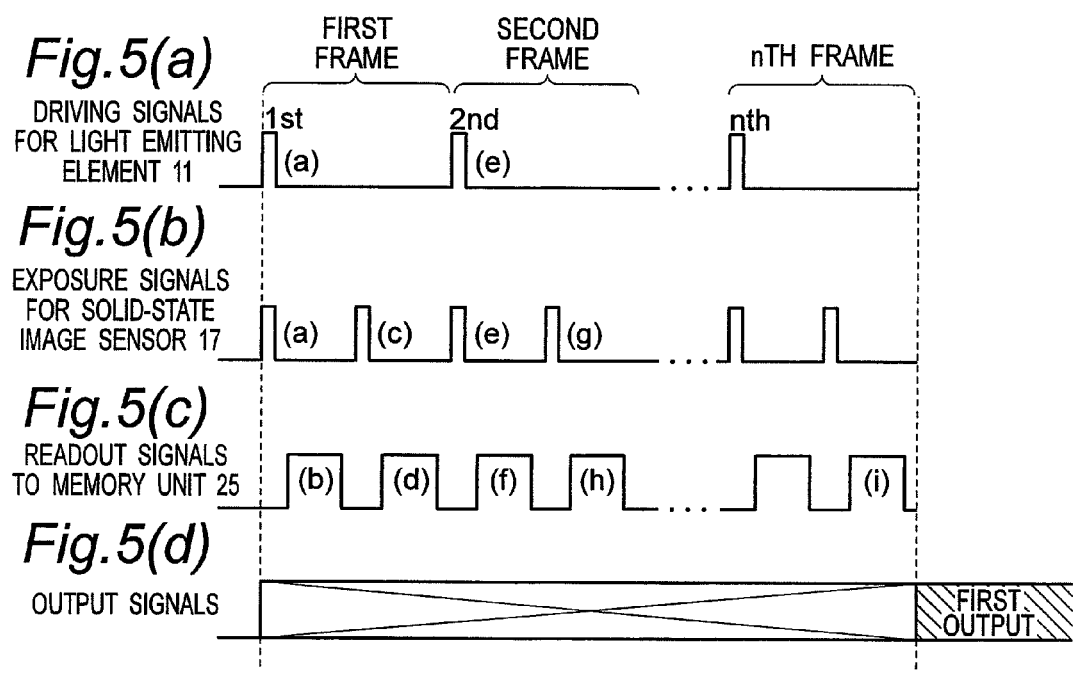

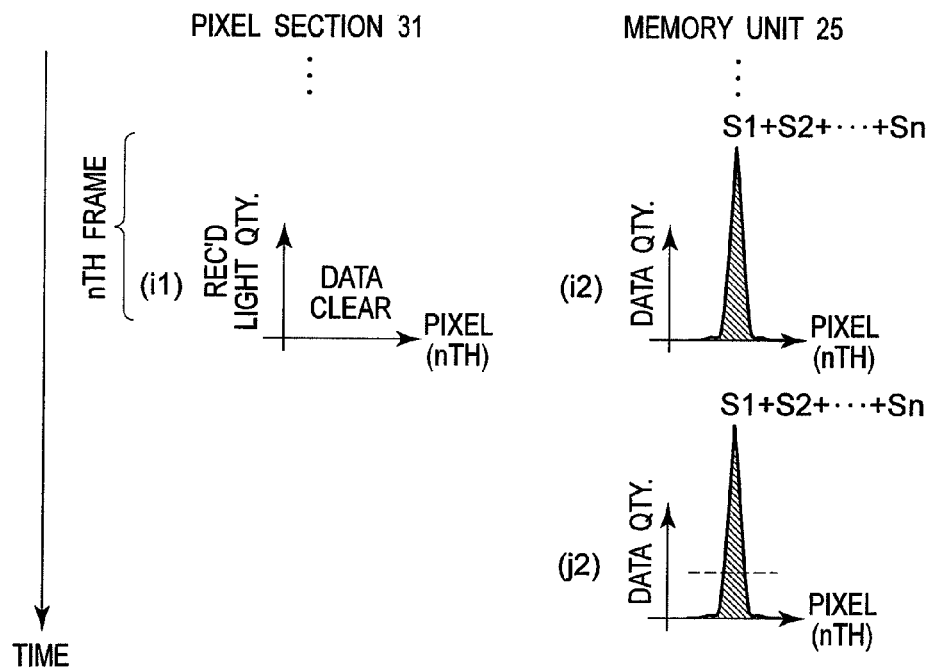
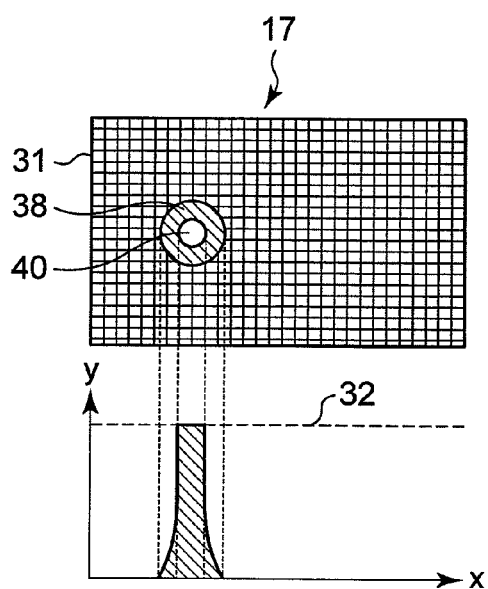 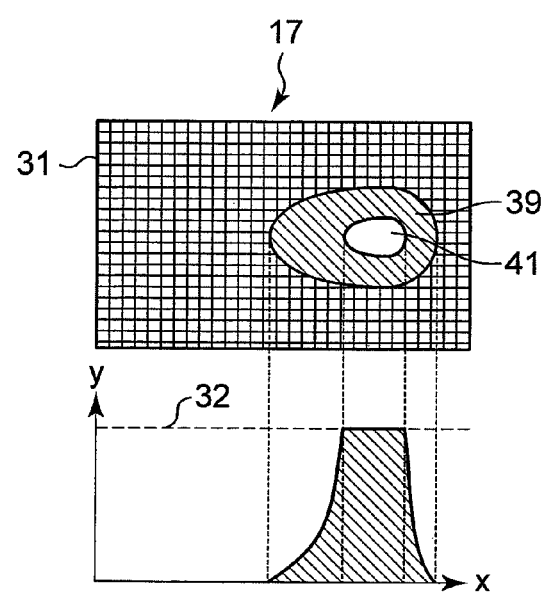

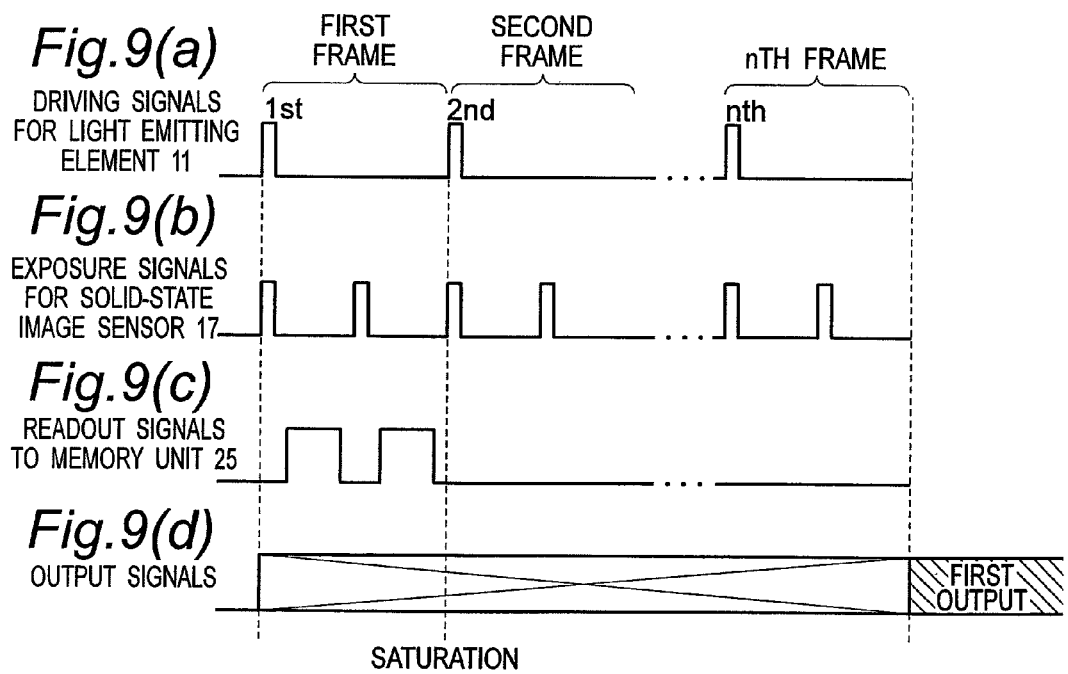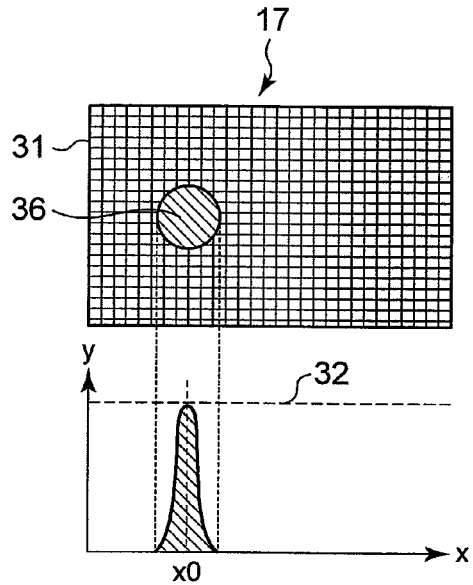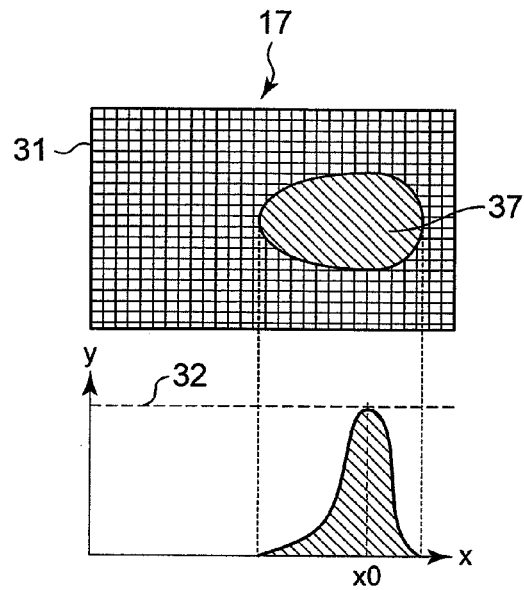

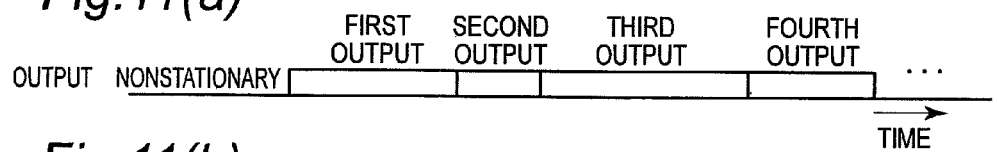
Fig.11(a)
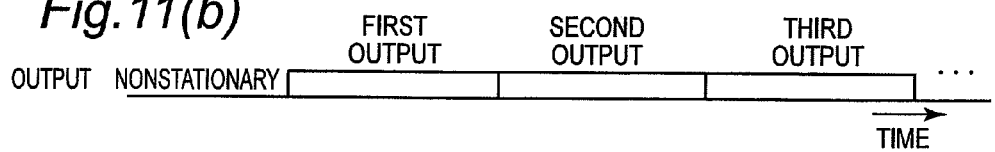
Fig.11(b)
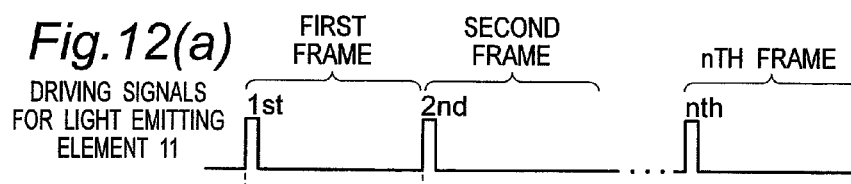
Fig.12(a) DRIVING SIGNALS FOR LIGHT EMITTING ELEMENT 11
Fig.12(b) EXPOSURE SIGNALS FOR SOLID-STATE IMAGE SENSOR 17
Fig.12(c) READOUT SIGNALS TO MEMORY UNIT 25
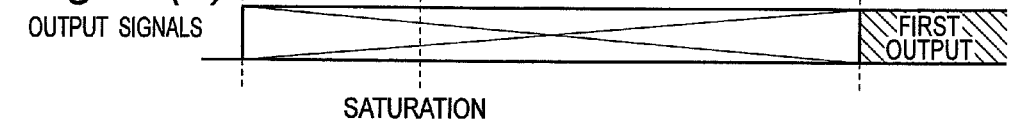
Fig.12(d) OUTPUT SIGNALS

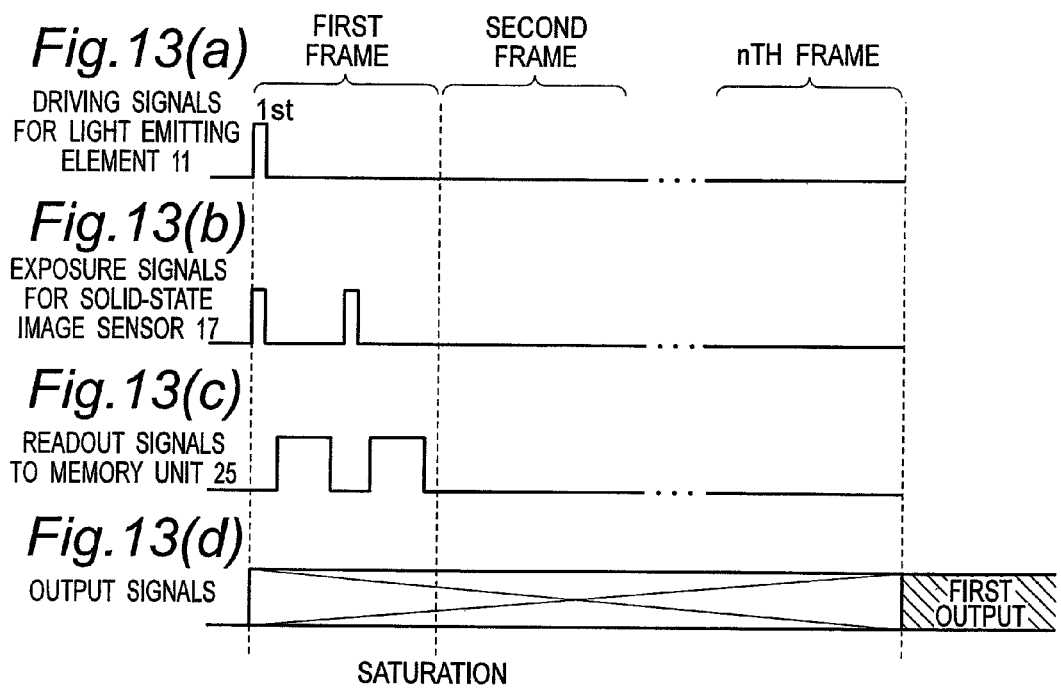
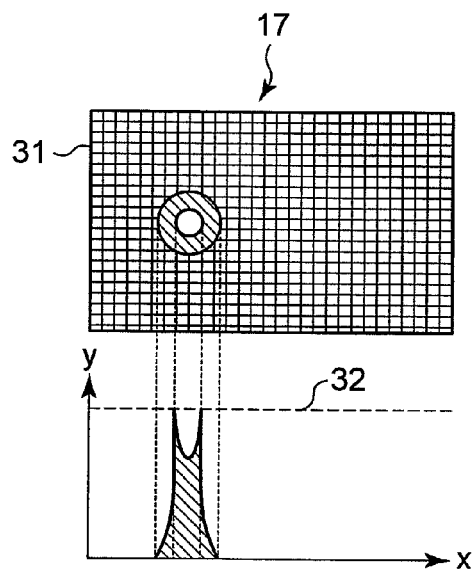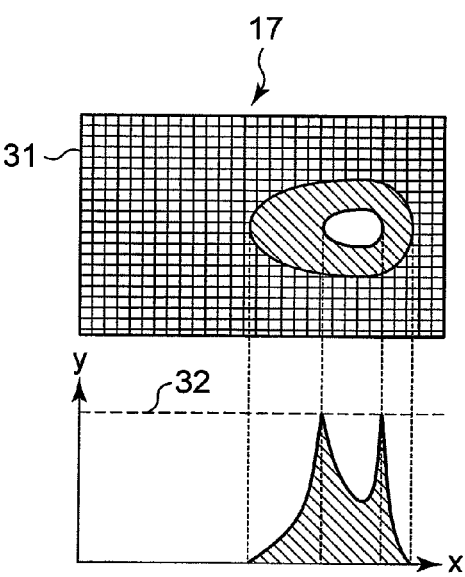

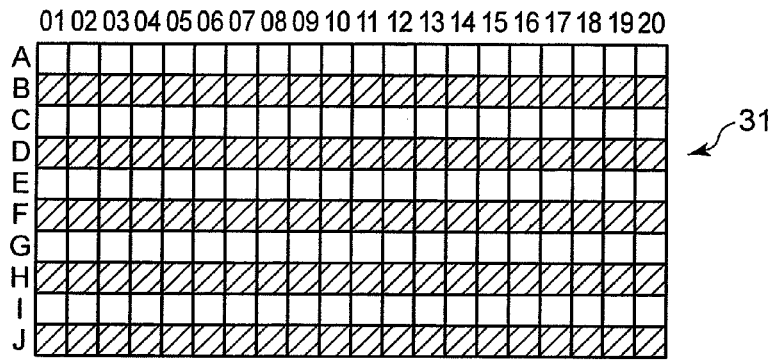
Fig.17(a)
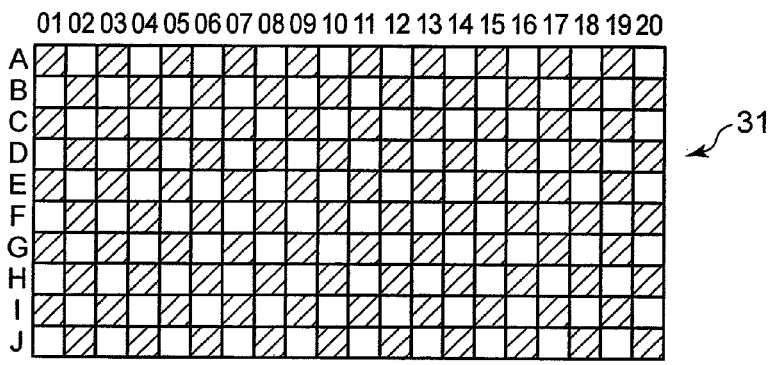
Fig.17(b)
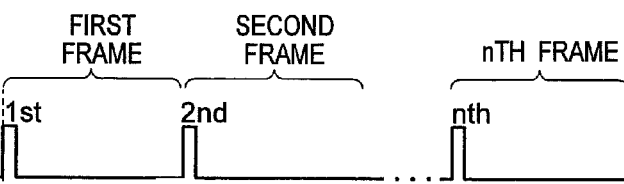
Fig.18(a) DRIVING SIGNALS FOR LIGHT EMITTING ELEMENT 11
Fig.18(b) EXPOSURE SIGNALS FOR SOLID-STATE IMAGE SENSOR 17
Fig.18(c) READOUT SIGNALS TO MEMORY UNIT 25
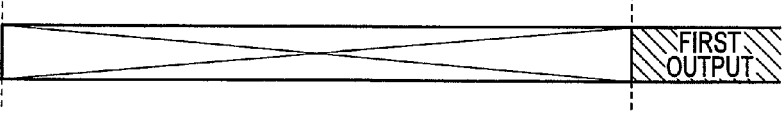
Fig.18(d) OUTPUT SIGNALS

LIGHT SPOT POSITION DETECTION DEVICE, OPTICAL DEVICE INCLUDING THE SAME, AND ELECTRONIC EQUIPMENT INCLUDING THE OPTICAL DEVICE

TECHNICAL FIELD

The present invention relates to a light spot position detection device for detecting a position of a light spot formed on a solid-state image sensor by an optical system, an optical device including the same, and electronic equipment including the optical device.

BACKGROUND ART

Optical distance measuring devices are typical among devices equipped with light spot position detection devices for detecting a position of a light spot on a solid-state image sensor which spot is formed on the solid-state image sensor by an optical system. In a measurement principle of the optical distance measuring devices, for which triangulation ranging well known to public is used, a position of a received-light spot on the solid-state image sensor is detected and a distance to a measuring object is calculated on basis of change in incident angle of a pencil of reflected light from the measuring object upon the solid-state image sensor according to the distance to the measuring object.

Among such optical distance measuring devices is a distance measuring device disclosed in Patent Literature 1. In the distance measuring device, as shown in FIG. 19, an emission lens 1 and a light receiving lens 2 that have optical axes parallel to each other are placed at a distance of a base length S from each other. A near infrared LED (IRED) 3 is placed on the optical axis of the emission lens 1, and a position sensitive detector (PSD) 4 with a length b having an end face at a distance a from an optical axis of the light receiving lens 2 is placed, on the optical axis of the light receiving lens 2, at a distance as long as a focal length $f_j$ of the light receiving lens 2 from the light receiving lens 2.

Light energy emitted from the IRED 3 is reflected by a subject 5 that is at a distance L, passed through the light-receiving lens 2, and imaged on the PSD 4. The PSD 4 has two output terminals 1ch and 2ch. As a result of removal of stationary photocurrent components caused by sunlight or the like, a predetermined relational expression holds between output currents $i_1$, $i_2$ from the output terminals 1ch and 2ch and an incident position x of a reflected spot light. Then $i_2/(i_1+i_2)$ is calculated by a signal processing IC (integrated circuit) that drives the IRED 3 and that calculates distances, so that an inverse number of the distance L to the subject 5 can be calculated.

Among optical distance measuring devices in which a solid-state imaging device is used as a light receiving element in place of the PSD is a distance measuring device for camera disclosed in Patent Literature 2. In the distance measuring device for camera, as shown in FIG. 20, light emitted from an infrared LED 6 passes through an emission lens 7 and reaches a subject 8. Reflection of the light passes through a light receiving lens 9 and is made to be incident on a light receiving element 10 consisting of a solid-state imaging device. On basis of a position of an image of the infrared LED 6 on the solid-state imaging device 10, distance measuring is performed in an active method. The position of the image of the infrared LED 6 on the solid-state imaging device 10 is detected by calculation of light quantity distribution of the light spot imaged on the solid-state imaging device 10.

For optical distance measuring devices, there are various demands to have improved performance in that a wide range of distances from short to long to measuring objects can be measured, in that distances can be measured under environments with strong disturbance light in outdoor or the like, and so on, to be reduced in size, and the like.

The distance measuring device disclosed in Patent Literature 1 is composed of the three chips, i.e., the IRED 3, the PSD 4, and the signal processing IC. Because of low resolving power in the detection of light spot position by the PSD 4, a size of the PSD 4 is required to be comparatively large so as to ensure a large distance S between the light emission and the reception. Accordingly, there are many difficulties in size reduction of the device. In terms of manufacturing cost, it is not suitable to integrate the PSD 4, having the large size, with the signal processing IC.

In the distance measuring device for camera that is disclosed in Patent Literature 2, by contrast, the solid-state imaging device is used as the light receiving element 10 and thus the signal processing circuit can be built into the light receiving element 10. Therefore, the device is superior in feasibility of size reduction in that the device can be composed of two chips, i.e., a light emitting element consisting of the infrared LED 6 and the light receiving element 10 consisting of the solid-state image sensor. Furthermore, the device is superior in feasibility of size reduction in that a distance between the emission lens 7 and the light receiving lens 9 can be reduced because the device is superior to the PSD 4 of Patent Literature 1 in resolving power for light spot position on the light receiving element 10.

In order to make it possible to measure a wide range of distances from short to long, it is required to widen a dynamic range of quantity of light received by the light-receiving element. In the distance measuring device disclosed in Patent Literature 1, in this regard, conditions of integration, light emission and the like are controlled so that output data from the PSD 4 are within a convertible range of A/D converting means.

For improvement in resistance to disturbance light in the distance measuring device disclosed in Patent Literature 1, conditions of integration and the like on the output currents $i_2$ from the PSD 4 are controlled so that saturation of the dynamic range of the A/D converting means is prevented and signal components are extracted from stored data. In the distance measuring device for camera that is disclosed in Patent Literature 2, a visible-light cut-off filter is used and signal components are extracted on basis of differences between presence and absence of the filter.

The conventional optical distance measuring devices, however, have such problems as follows.

In the distance measuring device disclosed in Patent Literature 1, initially, the measurement is performed with change in the integration conditions on the output currents $i_1$, $i_2$ from the PSD 4 according to measurement environment. Accordingly, short distances can be measured comparatively quick, whereas it takes much time to measure long distances. Thus unstable periods of distance measuring cause a problem in that it is extremely inconvenient for downstream equipment which takes in the distance measurements to use the device.

The signal processing with use of the PSD 4 causes another problem in that it is difficult to reduce the size of the device as described above.

On condition that the distance measuring device disclosed in Patent Literature 1 is applied to the solid-state imaging device, a poor quantity of light emitted from the IRED 3 and reflected by an object causes a problem in that difficulty in installation of an analog circuit for extracting only the reflected light that is originally emitted from the IRED 3 from the taken-in light which is a combination of the reflected light and disturbance light, invites poor resistance to the disturbance light.

In the distance measuring device for camera that is disclosed in Patent Literature 2, the resistance to disturbance light is improved by use of the solid-state image sensor as the light receiving element 10. There is a problem, however, in that it is difficult to measure distances short to long in the method using reflected light. Accordingly, measurement of long distances is performed with use of a passive method using a standard part and a reference part that are provided in the light-receiving element.

CITATION LIST

Patent Literature

Patent Literature 1: JP H5-280973 A
Patent Literature 2: JP H11-337815 A

SUMMARY OF INVENTION

Technical Problem

An object of the invention is to provide a light spot position detection device of small size that is capable of detecting positions of light spots of incident light from distances from short to long without increase in number of bits of a memory unit storing detection data having undergone A/D conversion, capable of detecting the positions of the light spots in an environment with strong disturbance light, and capable of allowing output thereof to be easily taken into downstream equipment, and to provide an optical device including the same, and electronic equipment including the optical device.

Solution to Problem

In order to solve the problems, there is provided, according to the present invention, a light spot position detection device comprising:
  a light emitting element,
  a condensing lens for condensing a pencil of light emitted from the light emitting element or a pencil of light resulting from reflection of the pencil of light by an object;
  a solid-state image sensor on which a light spot is formed by the pencil of light or pencil of reflected light condensed by the condensing lens,
  a pixel section that is provided in the solid-state image sensor and that includes pixels for detecting the light spot and performing conversion into pixel data corresponding to a quantity of received light,
  a digital converting unit for converting the pixel data of the pixels in the pixel section into digital values,
  a memory unit for storing the pixel data, converted into digital values by the digital converting unit, into storage portions corresponding to the respective pixels of the pixel section,
  a processor unit for computing a position of the light spot on the pixel section on basis of the digital pixel data stored in the memory unit, and
  a control unit for controlling the light emitting element, the solid-state image sensor, the memory unit, and the processor unit, and thereby detecting the position of the light spot formed on the solid-state image sensor, wherein a frame of operation to be performed by the control unit includes:
  controlling the light emitting element so as to effect light emission thereof for a specified period of time;
  controlling the solid-state image sensor so as to effect exposure thereof to light for the specified period of time in synchronization with the light emission of the light emitting element or asynchronously to the light emission of the light emitting element; and
  controlling the solid-state image sensor and the memory unit so as to add pixel data of the pixels, obtained in the pixel section in the exposure of the solid-state image sensor for the specified period of time in synchronization with the light emission of the light emitting element, to the corresponding storage portions in the memory unit and so as to subtract pixel data of the pixels, obtained in the pixel section in the exposure of the solid-state image sensor for the specified period of time asynchronous to the light emission of the light emitting element, from the corresponding storage portions in the memory unit, and thereby storing the storage portions with pixel data of only signal light composed of the light emitted from the light emitting element or the reflected light resulting from the reflection of the light by the object, and
the control unit controls the light emitting element, the solid-state image sensor and the memory unit so as to repetitively perform a given number of the frames of operation to accumulate the pixel data of only the signal light in the storage portions in the memory unit,
the control unit controls the processor unit so that the processor unit calculates the position of the light spot on the pixel section on basis of the pixel data of only the signal light accumulated and stored in the storage portions in the memory unit, and
the control unit thereby derives output of positional information on the light spot for the given number of frames whether the storage portions in the memory unit are saturated or not with the pixel data.

According to the above configuration, the given number of the frames of operation are repetitively performed in which the pixel data of the pixels, obtained in the pixel section in the exposure of the solid-state image sensor in synchronization with the light emission of the light emitting element, is added to the storage portions in the memory unit, in which the pixel data of the pixels, obtained in the pixel section in the exposure of the solid-state image sensor asynchronous to the light emission of the light emitting element, is subtracted from the storage portions in the memory unit, and in which the pixel data of only the signal light is thereby stored in the storage portions, so that the pixel data of only the signal light is accumulated in the storage portions in the memory unit.

Thus the position of the light spot on the pixel section can be detected with high accuracy even though the light spot position detection device of small size is used, even though the object is at a long distance, and/or even though the disturbance light is strong.

Furthermore, the positional information on the light spot for the given number of frames is outputted whether the storage portions in the memory unit are saturated or not with the pixel data. Therefore, the output timing of the positional information on the light spot can be made uniform and the control for downstream that is performed with capture of the output of the positional information on the light spot can be facilitated. That is, the light spot position detection device is extremely easy for users to use. In addition, positions of light spots of incident light from distances from short to long can be detected without increase in number of bits of the storage portions in the memory unit.

In one embodiment, the control unit controls the solid-state image sensor and the memory unit so as not to perform the addition to and the subtraction from the storage portions in the memory unit in frames following the saturation of any of the storage portions in the memory unit with the pixel data of the signal light and holds the pixel data in the storage portions in the saturated state.

In another embodiment, the control unit controls the solid-state image sensor so as not to perform the exposure of the solid-state image sensor in frames following the saturation of any of the storage portions in the memory unit with the pixel data of the signal light.

In a still another embodiment, the control unit controls the light emitting element so as to suspend the light emission of the light emitting element in frames following the saturation of any of the storage portions in the memory unit with the pixel data of the signal light.

According to the above three embodiments, the collapse of the profile of the intensity distribution of received light that is caused by the saturation with the pixel data can be minimized into the frame in which the storage portions are saturated in the first place. Accordingly, the calculation of the light spot position based on the profile of the intensity distribution of received light can be achieved even if the memory unit is saturated with the pixel data. As a result, detection of light spot positions in a wide dynamic range can be achieved.

Furthermore, unnecessary accumulation of pixel data in the storage portions in the memory unit is not performed, so that increase in the number of bits per storage portion in the memory unit and wasteful power consumption can be prevented.

In one embodiment, the processor unit is arranged and configured such that the processor unit finds a profile of intensity distribution of received light around pixels of the pixel section corresponding to the storage portions saturated with the pixel data of the signal light on basis of pixel data of storage portions positioned around the saturated storage portions in the memory unit and computes the position of the light spot on the pixel section with use of the profile of the intensity distribution of received light.

In another embodiment, the processor unit is arranged and configured such that the processor unit finds a shape in plan of an aggregate of pixels of the pixel section corresponding to the storage portions saturated with the pixel data of the signal light on basis of the saturated storage portions in the memory unit and computes the position of the light spot on the pixel section with use of the shape in plan.

According to the above two embodiments, the calculation of the position of the light spot can inexpensively be performed without increase in the number of bits of the storage portions in the memory unit.

In one embodiment, the control unit controls the solid-state image sensor and the memory unit so as to perform subtraction of pixel data of pixels of the pixel section corresponding to the saturated storage portions, which data is obtained in the pixel section in the exposure of the solid-state image sensor for the specified period of time in synchronization with the light emission of the light emitting element, from the corresponding storage portions in the memory unit and so as to perform addition of pixel data of the pixels, which data is obtained in the pixel section in the exposure of the solid-state image sensor for the specified period of time asynchronous to the light emission of the light emitting element, to the corresponding storage portions in the memory unit, on condition that the storage portions in the memory unit are saturated with the pixel data of the signal light.

According to the embodiment, a portion of the profile of the intensity distribution of received light accumulated in the memory unit which portion exceeds the saturation level is inverted with respect to the saturation level.

Namely, the profile of the intensity distribution of received light relating to the saturated storage portions can be obtained with a small number of bits, so that the position of the light spot can accurately be detected with use of an inexpensive configuration. As a result, detection of light spot positions in a wide dynamic range can be achieved.

In one embodiment, on condition that the pixel data stored in the storage portions in the memory unit becomes zero with the subtraction of the pixel data, in the exposure of the solid-state image sensor in synchronization with the light emission of the light emitting element, from the storage portions in the memory unit and with the addition of the pixel data, in the exposure of the solid-state image sensor asynchronous to the light emission of the light emitting element, to the storage portions in the memory unit, the control unit controls the solid-state image sensor and the memory unit so as to perform addition of pixel data of pixels of the pixel section corresponding to the storage portions of zero data, which pixel data is obtained in the pixel section in the exposure of the solid-state image sensor for the specified period of time in synchronization with the light emission of the light emitting element, to the corresponding storage portions in the memory unit, and so as to perform subtraction of pixel data of the pixels, which pixel data is obtained in the pixel section in the exposure of the solid-state image sensor for the specified period of time asynchronous to the light emission of the light emitting element, from the corresponding storage portions in the memory unit.

According to the embodiment, a portion of the profile of the intensity distribution of received light accumulated in the memory unit which portion exceeds the saturation level can be inverted with respect to the saturation level, and then a portion of the profile that is lower than the zero level can be inverted with respect to the zero level.

Namely, repeating the inversion on the saturation level and the inversion on the zero level makes it possible to obtain the profile of the intensity distribution of received light of the light spot in a wide dynamic range of received-light intensity with a small number of bits and to accurately detect the position of the light spot with use of an inexpensive configuration. As a result, the detection of the light spot can be achieved in the dynamic range that is infinitely wide in theory.

In one embodiment, on condition that a storage portion in the memory unit is saturated with the pixel data of the signal light, the control unit controls the solid-state image sensor and the memory unit so as to store pixel data, which is to be stored in the saturated storage portion, in a storage portion in the memory unit corresponding to a pixel in an area of the pixel section where the light spot is not formed.

According to the embodiment, the profile of the intensity distribution of received light relating to the saturated storage portions can be obtained with a small number of bits, so that the position of the light spot can accurately be detected with use of an inexpensive configuration. As a result, detection of light spot positions in a wide dynamic range can be achieved.

In one embodiment, the control unit, in one frame, controls the exposing operation of the solid-state image sensor such that first pixels to be exposed in synchronization with the light emission of the light emitting element and second pixels to be exposed asynchronously to the light emission of the light emitting element differ from each other, and that the first pixels adjoin respective ones of the second pixels in a direction and the adjoining pixels form pairs in positional relation, and controls image data storage operation performed by the solid-state image sensor and the memory unit so as to store a result of subtraction of pixel data in the second pixels from pixel data in the first pixels into the corresponding storage portions in the memory unit so that operation of storing image data into the memory unit is performed at a time in one frame.

According to the embodiment, it is unnecessary to provide the memory unit with the storage portions of which the number corresponds to that of all the pixels in the pixel section, and thus the capacity of the whole memory unit can be halved. Besides, readout of the pixel data from the pixel section to the memory unit has only to be performed one time in each frame, and thus power consumption can be reduced.

Furthermore, the pixel data for only the signal light can be accumulated in the storage portions by the readout of one time from the pixel section to the memory unit, so that time required for the detection of the position of the light spot can be reduced. Thus information can be detected from the object, the light emitting element or the like that is moving.

An optical device according to another aspect of the invention comprises the light spot position detection device, and a positional information calculating unit for calculating positional information including a distance and a direction concerning the object or the light emitting element on basis of the position of the light spot on the pixel section that is calculated by the processor unit.

According to the above configuration, there is provided the light spot position detection device that is capable of detecting the positions of the light spots of incident light from distances from short to long without increase in the number of bits of the memory unit, detecting the positions of the light spots under environment with small quantity of light incident on the solid-state image sensor, and allowing output thereof to be easily taken into downstream equipment. Accordingly, there can be provided the optical devices of small size, such as optical distance measuring devices, optical direction detecting devices, and light source direction detecting devices, that are capable of accurately calculating positional information including distance and direction on the object or the light emitting element.

The function of the positional information calculating unit can be given to the processor unit.

Electronic equipment according to the invention comprises the optical device.

According to the configuration, the optical device of small size that is capable of accurately detecting the distance to the object can be installed in a portable telephone with camera, a digital camera, or the like, and the distance can be used as a value of measured distance for auto focusing, so that the portable telephone with camera, the digital camera and the like that have small sizes and that offer high performance can be provided. The optical direction detecting device of small size that is capable of accurately detecting the direction of the object can be installed in a liquid crystal display or the like and can be used as a device for performing on/off control over a power source of the monitor with detection of presence or absence of human, so that the liquid crystal display or the like that has small size and that offers high performance can be provided. The light source direction detecting device of small size that is capable of accurately detecting the direction of the light emitting element can be installed in air-conditioning equipment, video equipment or the like, and can be used as a device for identifying direction, position or the like of a remote control (light source) and controlling the equipment, so that the air-conditioning equipment, the video equipment or the like that has small size and that offers high performance can be provided.

Advantageous Effects of Invention

As is apparent from the above, a given number of the frames of operation are repetitively performed in which the pixel data of only the signal light is stored in the storage portions in the memory unit, so that the pixel data of only the signal light is accumulated in the storage portions. Therefore, the position of the light spot on the pixel section can be detected with high accuracy even though the light spot position detection device of small size is used, even though the object is at a long distance, and/or even though the disturbance light is strong.

Furthermore, because the positional information on the light spot for the given number of frames is outputted whether the storage portions in the memory unit are saturated or not with the pixel data, the output timing of the positional information on the light spot can be made uniform. Thus, the control for downstream that is performed with capture of the output of the positional information on the light spot can be facilitated, and the light spot position detection device is extremely easy for users to use. In addition, positions of light spots of incident light from distances from short to long can be detected without increase in number of bits of the storage portions in the memory unit.

The optical device of the invention comprises the light spot position detection device that is capable of detecting the positions of the light spots of incident light from distances from short to long without increase in the number of bits of the memory unit, detecting the positions of the light spots under environment with small quantity of light incident on the solid-state image sensor, and allowing output thereof to be easily taken into downstream equipment. Accordingly, there can be provided optical devices of small size that are capable of accurately calculating positional information including distance and direction on the object or the light emitting element.

Electronic equipment according to the invention comprises the optical device that are capable of accurately calculating positional information including distance and direction on the object or the light emitting element. Thus, the electronic equipment has small size and offers high performance.

BRIEF DESCRIPTION OF DRAWINGS

The present invention will become more fully understood from the detailed description given hereinbelow and the accompanying drawings which are given by way of illustration only, and thus are not intended to limit the present invention, and wherein:

FIGS. 5(a) through 5(d) are operation timing charts of the optical distance measuring device shown in FIG. 1;

FIG. 7 shows accumulating operations for signal light that follow the operations of FIG. 6;

FIGS. 8(a) and 8(b) are diagrams showing states and intensity distributions of received light of light spots in a state in which pixel data in a memory unit has reached a saturation level;

FIGS. 9(a) through 9(d) are operation timing charts under a condition that pixel data in the memory unit reaches the saturation level;

FIGS. 10(a) and 10(b) are diagrams showing states and intensity distributions of received light of light spots under a condition that accumulating operations for signal light are performed in accordance with FIGS. 9(a) through 9(d);

FIGS. 11(a) and 11(b) are diagrams showing output timing of results of distance measurement;

FIGS. 12(a) through 12(d) are operation timing charts, different from FIGS. 9(a) through 9(d), under a condition that pixel data in the memory unit reaches the saturation level;

FIGS. 13(a) through 13(d) are operation timing charts, different from FIGS. 9(a) through 9(d) and FIGS. 12(a) through 12(d), under the condition that pixel data in the memory unit reaches the saturation level;

FIGS. 14(a) and 14(b) are diagrams showing states and intensity distributions of received light of light spots under a condition that pixel data for pixels exceeding the saturation level is inverted with respect to the saturation level;

FIGS. 17(a) and 17(b) are illustrations of methods for exposing the pixel section in which mixture of signal light and disturbance light and only the disturbance light are accumulated in different pixels;

FIGS. 18(a) through 18(d) are operation timing charts of the optical distance measuring device that performs the exposing methods shown in FIGS. 17(a) and 17(b);

DESCRIPTION OF EMBODIMENTS

Figure 1:
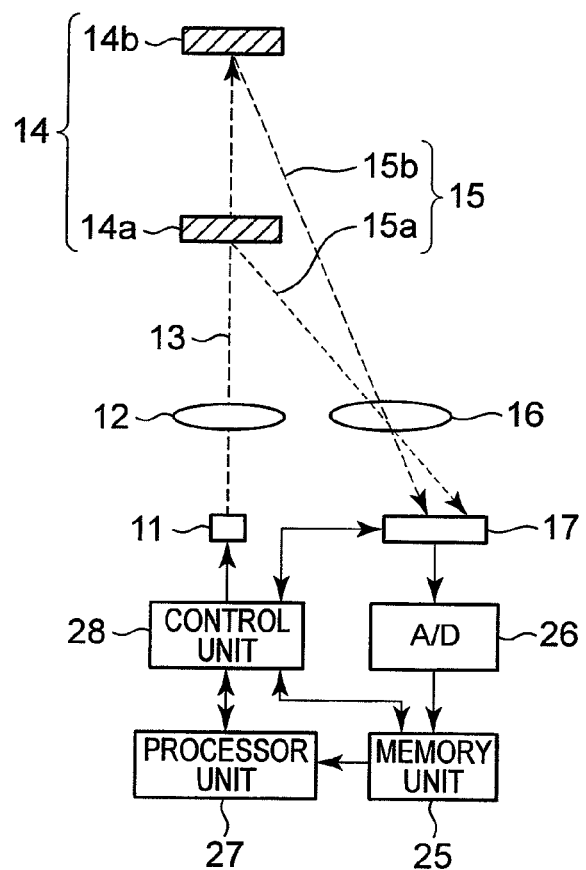
FIG. 1 is a schematic configuration of a light spot position detection device of the invention that is applied to an optical distance measuring device.

Hereinbelow, the invention will be described in detail with reference to embodiments shown in the drawings.

First Embodiment

FIG. 1 is a schematic configuration of a light spot position detection device in accordance with an embodiment that is applied to an optical distance measuring device based on triangulation. In FIG. 1, light emitted from a light emitting element 11 consisting of an LED (light-emitting diode) or an LD (laser diode) is condensed by an emission lens 12 so as to be formed into a pencil of emitted light 13, and undergoes diffused reflection on a measuring object 14. A pencil 15 of reflected light is condensed by a condensing lens 16 so that a light spot image is formed on a solid-state image sensor 17. Reference sign 14a denotes the measuring object that is at a short distance and reference sign 14b denotes the measuring object that is at a long distance. Reference sign 15a denotes the pencil of light reflected by the measuring object 14a at the short distance and reference sign 15b denotes a pencil of light reflected by the measuring object 14b that is at the long distance.

As seen from FIG. 1, a light spot formed on the solid-state image sensor 17 by the pencil 15a of light reflected by the measuring object 14a at the short distance is imaged at a position more distant from an optical axis of the light emitting element 11 than a light spot formed by the pencil 15b of light reflected by the measuring object 14b at the long distance. Thus the distance to the measuring object 14 can be detected on the basis of the position where the light spot is formed on the solid-state image sensor 17.

Figure 2:
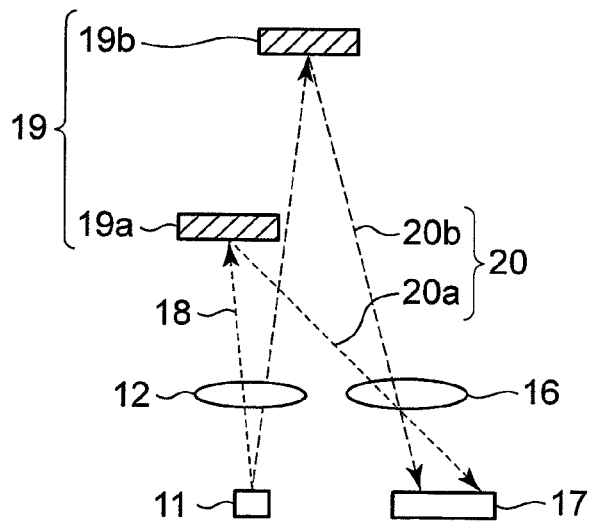
FIG. 2 is a schematic configuration of the light spot position detection device of the invention that is applied to an optical direction detecting device.

Like FIG. 1, FIG. 2 is a schematic configuration of a light spot position detection device that is applied to an optical direction detecting device based on triangulation. In FIG. 2, however, a measuring object 19 can be positioned in different directions. In contrast to perpendicular emission in FIG. 1, the measuring object 19 is irradiated with a pencil 18 of light emitted from the light emitting element 11 with the pencil having an angle of divergence or while being scanned with the pencil. A pencil 20 of light reflected by the measuring object 19 is condensed by the condensing lens 16 so that a light spot image is formed on the solid-state image sensor 17. Reference sign 19a denotes the measuring object that is at a short distance and on the left side of the optical axis of the light emitting element 11 and reference sign 19b denotes the measuring object that is at a long distance and on the right side of the same. Reference sign 20a denotes the pencil of light reflected by the measuring object 19a at the short distance and on the left side and reference sign 20b denotes the pencil of light reflected by the measuring object 19b that is at the long distance and on the right side.

As seen from FIG. 2, an incident angle of the pencil 20 of reflected light on the solid-state image sensor 17 changes according to a position of the measuring object 19, so that a position of the light spot formed on the solid-state image sensor 17 is shifted. Thus the direction in which the measuring object 19 exists can be identified by detection of a position where the light spot is formed on the solid-state image sensor 17.

Figure 3:
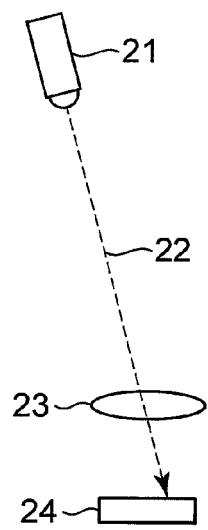
FIG. 3 is a schematic configuration of the light spot position detection device of the invention that is applied to a light source direction detecting device.

Though the direction in which the measuring object 19 exists is identified on basis of the reflected light in the FIG. 2 configuration, FIG. 3 shows a configuration of a light source direction detecting device for identifying a direction in which a light emitting element itself exists. In FIG. 3, a pencil 22 of light emitted from the light emitting element 21 is condensed by a condensing lens 23 so that a light spot image is formed on a solid-state image sensor 24. In this configuration, an incident angle of light on the solid-state image sensor 24 changes according to a position of the light emitting element 21 so that a position of the light spot formed on the solid-state image sensor 24 is shifted. Thus the direction in which the light emitting element 21 exists can be identified by detection of the position where the light spot is formed on the solid-state image sensor 24.

The light spot position detection devices of the embodiment include, in addition to the configuration shown in FIG. 1, 2, or 3 (in FIG. 1, only a section corresponding to the configuration shown in FIGS. 2 and 3), a memory unit for storing pixel data of pixels of the solid-state image sensor 17, 24, a processor unit for computing the position of the light spot formed on the solid-state image sensor 17, 24 on the basis of the pixel data stored in the memory unit, and a control unit for controlling the light emitting element 11, 21, the solid-state image sensor 17, 24, the memory unit, and the processor unit for detection of the light spot position. The memory unit, the processor unit, and the control unit, however, do not have to be integrated with the light emitting element 11, 21, the emission lens 12, the condensing lens 16, 23, and the solid-state image sensor 17, 24.

Provided that devices, such as the optical distance measuring device, the optical direction detecting device, and the light source direction detecting device, in which the light spot position detection device is to be installed, are defined as "optical devices," and that optical devices to be installed with the elements 11, 21, 17, 24 and the lenses 12, 16, 23 have a memory unit, a processor unit, and a control unit, the present invention encompasses cases in which the memory unit, the processor unit, and the control unit for the optical devices are used as a memory unit, a processor unit, and a control unit for the light spot position detection device.

Though the light spot position detecting device has various applications as described above, the device applied to the most typical optical distance measuring device of reflection type shown in FIG. 1 will be described hereinbelow. The optical distance measuring device of reflection type shown in FIG. 1 includes a memory unit 25 for storing pixel data of the pixels of the solid-state image sensor 17, 24, an A/D converting unit 26 for performing A/D conversion of the pixel data from the solid-state image sensor 17 and sending the data to the memory unit 25, a processor unit 27 for computing the position of the light spot formed on the solid-state image sensor 17 on basis of the pixel data (digital values) stored in the memory unit 25 and calculating a distance to the measuring object 14 from a result of the computation, and a control unit 28 for detecting the light spot position by control over the light emitting element 11, the solid-state image sensor 17, the memory unit 25, and the processor unit 27. As the memory unit 25, the processor unit 27, and the control unit 28, it is safe to use the memory unit, the processor unit, and the control unit for the optical distance measuring device (optical device) as described above.

Figure 4A:
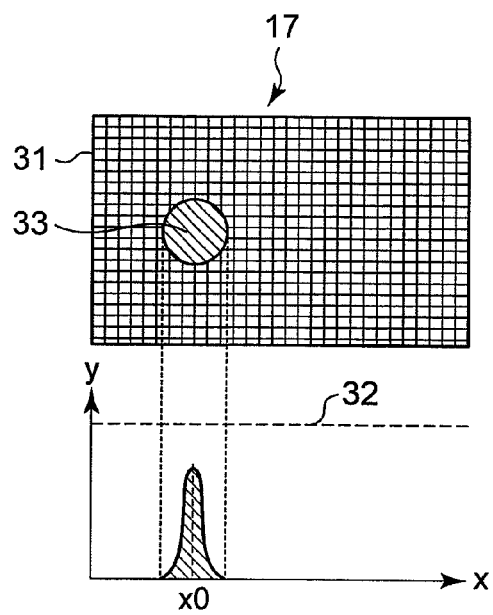
FIGS. 4(a) and 4(b) are diagrams showing states and intensity distributions of received light of light spots in FIG. 1.
Figure 4B:
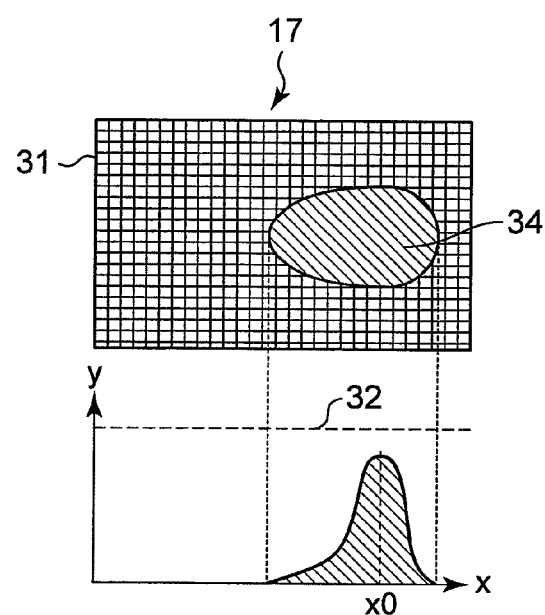

FIGS. 4(a) and 4(b) show (in upper parts in FIGS. 4(a) and 4(b)) states of the light spot formed on the solid-state image sensor 17 in FIG. 1 and (in lower parts in FIGS. 4(a) and 4(b)) horizontal distributions of intensity of received light at a largest horizontal width of the light spot in the drawing. FIG. 4(a) shows the state of imaging of the measuring object 14 that is at a long distance. On the other hand, FIG. 4(b) shows the state of imaging of the measuring object 14 that is at a short distance.

The intensity distributions of received light shown in the lower parts of FIGS. 4(a) and 4(b) are expressed by pixel data stored in respective storage portions of the memory unit 25 that correspond, on one to one basis, to pixels of the pixel section 31 of the solid-state image sensor 17. The x-axis represents the horizontal positions (pixel order) in the pixel section 31, and the y-axis represents number of bits of the pixel data (digital values) in the corresponding storage portions. Broken lines 32 in the drawings represent a saturation level of the memory unit 25, which level corresponds to the 256th level in the 8-bit system.

In FIG. 4(a), a light spot 33 is formed on a side of the pixel section 31 that is the nearer to the light emitting element 11. The pixel data (digital values) stored in the memory unit 25 has not reached the saturation level 32 and thus the light spot is ideally detected, so that a light spot position "x0" has been detected. In FIG. 4(b), similarly, a light spot 34 is formed on a side of the pixel section 31 of the solid-state image sensor 17 that is the farther from the light emitting element 11. On condition that the measuring object 14 is at a short distance, the incident angle increases. Thus, the angle of incidence on the light receiving lens 16 increases relative to that in FIG. 4(a). Therefore, the spot has a shape that is not like a perfect circle as shown in FIG. 4(a) but is distorted. In FIG. 4(b), as in FIG. 4(a), the pixel data stored in the memory unit 25 has not reached the saturation level 32 in any pixels and thus the shape of the light spot is in an ideal state for measurement, so that a light spot position "x0" has been detected.

FIGS. 5(a) through 5(d) show operation timing charts of the optical distance measuring device in which the light spot position detection device having the above configuration is installed. FIG. 5(a) shows driving signals for the light emitting element 11, FIG. 5(b) shows shutter driving (exposure) signals for the solid-state image sensor 17, FIG. 5(c) shows readout signals from the pixel section 31 to the memory unit 25, and FIG. 5(d) shows output signals that represent a result of distance measuring. With the operation timing of the optical distance measuring device, all the pixels of the pixel section 31 and all the storage portions of the memory unit 25 perform the same operation.

Figure 6:
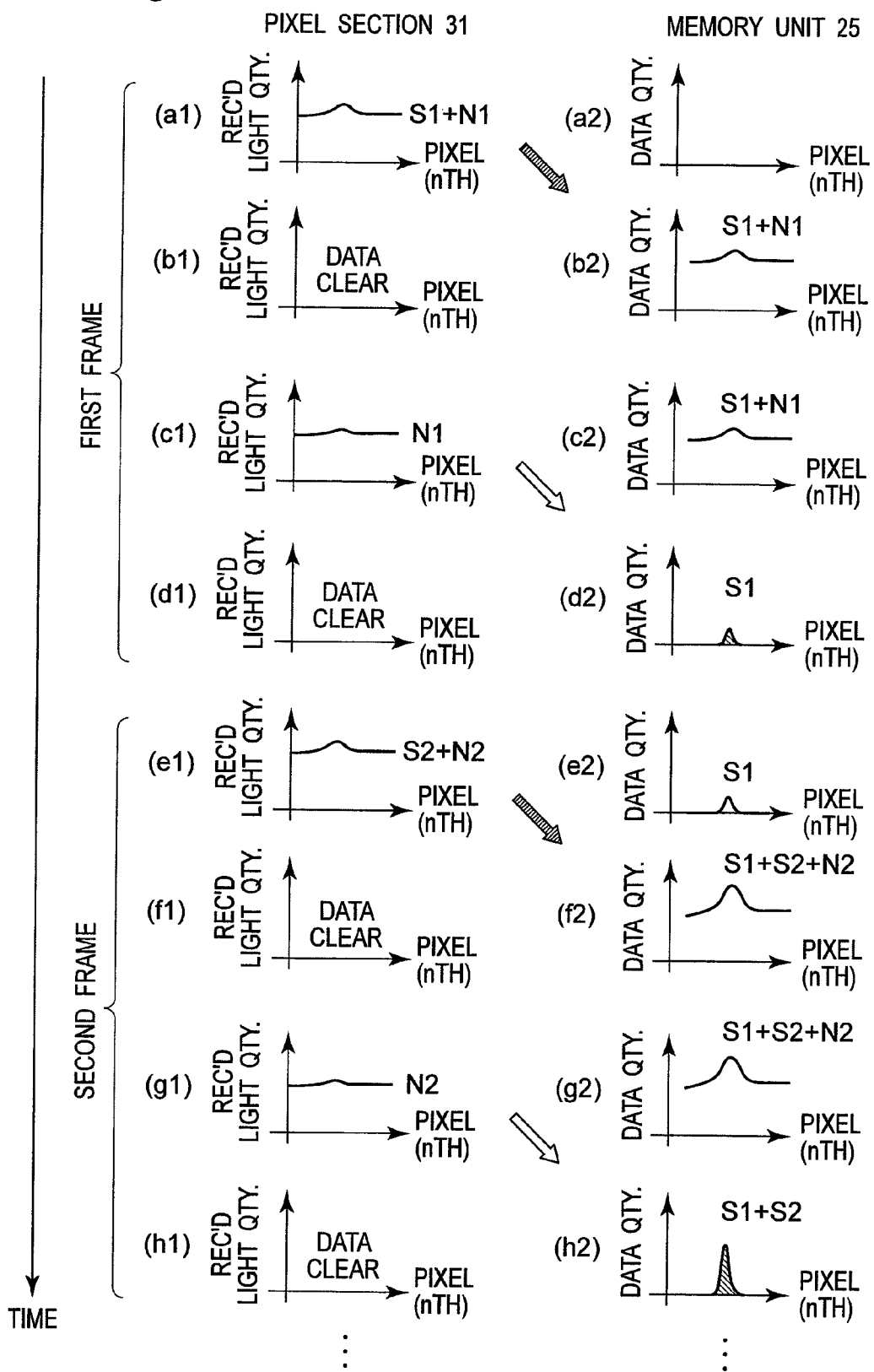
FIG. 6 shows accumulating operations for signal light that are performed in accordance with FIGS. 5(a) through 5(d)

FIGS. 6 and 7 are diagrams for illustrating accumulating operations for signal light that are performed with removal of disturbance light in a row of pixels in the pixel section 31 in accordance with the timing charts shown in FIGS. 5(a) through 5(d). In FIGS. 6 and 7, states of the pixel row of the pixel section 31 are shown on left side thereof and states of the storage portions of the memory unit 25 that correspond to the pixel row are shown on the right side. In both the drawings, time elapses from upper part thereof along downward direction. In the states of the pixel row, axes of abscissa represent positions of the pixels (pixel order), and axes of ordinates represent quantities of light received by the pixels. In the states of the storage portions, axes of abscissa represent positions (pixel order) of the storage portions (pixels), and axes of ordinates represent numbers of bits of the accumulated pixel data (digital values) in the storage portions (pixels). Hereinbelow, the operations of the optical distance measuring device will be described in detail with reference to FIGS. 5(a)-5(d) through FIG. 7.

Initially, the light emitting element 11 emits light with timing (a) in a first frame, as shown in FIG. 5(a), and a shutter of the solid-state image sensor 17 is simultaneously opened as shown in FIG. 5(b) so that exposure is carried out for a period of time as long as that of the light emission. Thus the incident light is converted into electric charge and then accumulated. In this state, which corresponds to FIG. 6 (a1) for the pixel section 31, a light spot is formed by "both of signal light (S1) emitted from the light emitting element 11 and reflected by the measuring object 14b and disturbance light (N1)" that are incident through the condensing lens 16 on the pixel section 31. At this point in time, the memory unit 25 is in an initial state and, therefore, is not yet stored with pixel data, as shown in FIG. 6 (a2).

With timing (b), subsequently, the readout signal is outputted from the control unit 28 to the solid-state image sensor 17 and to the memory unit 25 as shown in FIG. 5(c). Then the pixel data accumulated as electric charge in the pixel section 31 as shown in FIG. 6, (a1), is converted into digital values by the A/D converting unit 26, and the values are added into the memory unit 25 as shown by a hatched arrow and in FIG. 6 (b2). After that, the pixel data (electric charge) accumulated in the pixel section 31 is cleared as shown in FIG. 6 (b1).

With timing (c), subsequently, the light emitting element 11 is not activated as shown in FIG. 5(a), while the solid-state image sensor 17 is exposed to light as shown in FIG. 5(b) so that a light spot is formed only by the disturbance light (N1). In this state, which corresponds to FIG. 6, (c1), on the side of the pixel section 31 in FIG. 6, the state of "signal light (S1) plus disturbance light (N1)" still remains on the side of the memory unit 25 as shown in FIG. 6 (c2).

With timing (d), subsequently, the readout signal is outputted from the control unit 28 to the solid-state image sensor 17 and to the memory unit 25 as shown in FIG. 5(c). Then the pixel data accumulated as electric charge in the pixel section 31 as shown in FIG. 6 (c1), is subtracted from data in the memory unit 25 as shown by a void arrow and in FIG. 6 (d2). After that, the pixel data accumulated in the pixel section 31 is cleared as shown in FIG. 6 (d1).

Temporal fluctuation of the disturbance light is minute. Therefore, it can be assumed that intensity of the disturbance light in FIG. 6 (a1) is equal to intensity of the disturbance light in FIG. 6 (c1). As shown in FIG. 6 (d2), consequently, the subtraction of a quantity of received light of the disturbance light (N1) accumulated in the pixel section 31 from the state of the memory part 25 shown in FIG. 6(c2) makes only the signal light component S1 remain in the memory part 25.

On condition that the disturbance light is weak and that the reflected signal light is sufficiently strong in this state, the position of the light spot on the pixel section 31 can be discriminated in one frame of operation. In ordinary conditions, however, it is impossible to discriminate the position of the light spot in one operation. This is because reduction in size of the light spot position detection device as in the present invention leads to reduction in size of the condensing lens 16 and hence reduction in quantity of received signal light, because reduction in size of the pixels for increasing resolving power leads to reduction in quantity of signal per pixel, because quantity of light coming from a long distance is slight, because improvement in resistance to disturbance light requires reduction in exposure time so as to prevent saturation of the pixel section 31, and so on. As a solution, as shown in FIGS. 5(a) through 5(d) and FIGS. 6 (e1), (e2) through 7 (i1), (i2), the same operation as in the first frame is repeated in a second frame, a third frame, . . . , an nth frame, so that signal light components are accumulated.

By such operations, as shown in FIG. 7 (j2), only the signal light components corresponding to a number of times of the accumulation can be summed up ($\Sigma Sn=S1+S2+ \ldots +Sn$) in the memory unit 25. Thus the position of the spot of the reflected light can be detected with high accuracy even though the light spot position detection device of small size is used, even though the measuring object 14 is at a long distance, and/or even though the disturbance light is strong. The pixel data detected by the pixel section 31 can be added to or subtracted from the memory unit 25 so as to be accumulated as shown in FIGS. 6 and 7. Accordingly, a storage for accumulating the pixel data in each frame is not required to be provided for each pixel, and thus the size of the solid-state image sensor 17 can be reduced.

Provided that a number of bits of a maximum quantity of received light which can be written into the memory unit 25 is large enough to allow a whole range of quantity of received light to be written, the spot position can ideally be calculated in the states of FIGS. 4(a) and 4(b). The maximum number of bits storable in the memory unit 25 is on the order of 6 to 8 bits, that is, on the order of at most 256 levels. In contrast to that, light density of the reflected light attenuates in proportion to square of the distance, and the measuring objects (reflectors) 14 may have various reflectances. On condition that the number of bits capable of expressing the quantity of received light is eight, it is conceivable that the memory unit 25 may be saturated when the distance to the measuring object 14 is short, when the reflectance of the measuring object 14 is high, or the like.

Like FIGS. 4(a) and 4(b), FIGS. 8(a) and 8(b) show states of the light spot formed on the pixel section 31 of the solid-state image sensor 17 (upper parts in FIGS. 8(a) and 8(b)) and horizontal distributions of intensity of received light in a largest width of the light spot in the horizontal direction in the drawing (lower parts in FIGS. 8(a) and 8(b)). FIG. 8(a) shows the state of imaging of the measuring object 14 that is at a long distance. On the other hand, FIG. 8(b) shows the state of imaging of the measuring object 14 that is at a short distance.

The intensity distributions of received light shown in the lower parts of FIGS. 8(a) and 8(b) are expressed by pixel data stored in storage portions of the memory unit 25 that correspond, on one to one basis, to pixels of the pixel section 31 of the solid-state image sensor 17. The x-axis therein represents the horizontal positions (pixel order) in the pixel section 31, and the y-axis represents number of bits of the pixel data (digital values) in the storage portions. Broken lines 32 in the drawings represent a saturation level of the memory unit 25. As seen from FIGS. 8(a) and 8(b), saturation of the memory unit 25 with the pixel data results in storage of the data as a fixed value and collapse of a profile of the intensity distribution of received light.

FIGS. 9(a) through 9(d) show timing charts of the optical distance measuring device, in consideration of such saturation of the memory unit 25 with the pixel data. When any of the storage portions in the memory unit 25 is saturated, e.g., in the first frame, the readout signal is kept from outputting from the control unit 28 to the solid-state image sensor 17 and to the memory unit 25, as shown in FIGS. 9(c) and 9(d). In the second frame and later, accordingly, the light spot is detected by the pixel section 31, while transfer and addition of pixel data to the memory unit 25 is suspended. As shown in FIGS. 10(a) and 10(b), this operation makes it possible to calculate the light spot position without collapse of a shape of a light spot 36, 37 and of a profile of intensity distribution of received light. The saturation of the memory unit 25 can be detected, for example, by the control unit 28 monitoring the pixel data in the memory unit 25.

Provided that completion of the measurement is determined and a result of the distance measurement is outputted immediately upon detection of the saturation of the memory unit 25 without execution, as described above, of frames later than the frame in which the memory unit 25 is saturated, output timing of the result of the distance measurement becomes random depending on the state of saturation of the memory unit 25 as shown in FIG. 11(a). In electronic equipment controlled by the output taken in from the optical distance measuring device, it is then difficult to determine a time zone in which data outputted from the optical distance measuring device and taken in by the electronic equipment is obtained as the result of the distance measurement, and it is inconvenient to use the equipment.

In contrast to that, execution of the subsequent frames for a predetermined period of time even after the saturation of the memory unit 25 as in the timing charts shown in FIGS. 9(a) through 9(d) makes the output timing of the result of the distance measurement uniform as shown in FIG. 11(b), and facilitates the control over the electronic equipment that is performed with capture of the output of the result of the distance measurement. In addition, wasteful power consumption can be reduced by the suspension of the output operation of the readout signal from the control unit 28 to the solid-state image sensor 17 and to the memory unit 25 as described above.

In the timing charts shown in FIGS. 9(a) through 9(d), even after the saturation of the memory unit 25, the light emitting element 11 continues emitting light as shown in FIG. 9(a), and the solid-state image sensor 17 is exposed to light as shown in FIG. 9(b). The invention, however, is not limited thereto. That is, the exposure operation for the solid-state image sensor 17 may be suspended as in timing charts shown in FIGS. 12(a) through 12(d), or both the light emitting operation of the light emitting element 11 and the exposure operation for the solid-state image sensor 17 may be suspended as in timing charts shown in FIGS. 13(a) through 13(d). In terms of reduction in power consumption, it is needless to say that the control operation in FIGS. 13(a) through 13(d) is the most preferable.

The saturation of the memory unit 25 with the image data that is shown in FIGS. 10(a) and 10(b) is in a state in which the pixel data stored in the memory unit 25 in the first frame slightly exceeds the saturation level. On condition that the image data stored in the memory unit greatly exceeds the saturation level with one light emitting operation of the light emitting element 11, a state of storage of the pixel data in the memory unit 25 cannot help having such a profile as shown in lower part FIG. 8(a) or 8(b) even if the subsequent frames are suspended as shown in FIGS. 9(a) through 9(d), FIGS. 12(a) through 12(d) and FIGS. 13(a) through 13(d). In such a case, a shape of the spot associated with the pixels that have caused saturation with the pixel data can be speculated from pixel data of pixels around the pixels that have caused saturation with the pixel data in the memory unit 25, so that the light spot position can be detected.

When the measuring object 14 is at a long distance, specifically, as shown in FIG. 8(a), the intensity distribution of received light in the horizontal direction in the drawing in the light spot 38 shown in lower part thereof has left-right symmetric slopes, in general, on both sides of the pixels having caused saturation with the pixel data. When the measuring object 14 is at a short distance, by contrast, as shown in FIG. 8(b), the intensity distribution of received light in the horizontal direction in the drawing in the light spot 39 shown in lower part thereof has slopes asymmetric with respect to a peak position on both sides of the pixels having caused saturation with the pixel data because the incident angle of the pencil 15a of reflected light on the solid-state image sensor 17 is increased. The profile of the intensity distribution of received light is determined by the condensing lens 16, and thus the spot position can easily be determined by a calculation from a profile of the intensity distribution of received light for pixels around the pixels having caused saturation with the pixel data.

The process of calculating the light spot position under a condition that image data stored in the memory unit 25 with one light emitting operation of the light emitting element 11 greatly exceeds the saturation level is not limited to that described above, but the light spot position can be found from a shape of an aggregate (which will be referred to as saturated pixel section, hereinbelow) of pixels having caused saturation with pixel data in the memory unit 25 in a light spot formed on the solid-state image sensor 17.

When the measuring object 14 is at a long distance, specifically, as shown in FIG. 8(a), the saturated pixel section 40 of the light spot 38 shown in upper part thereof is in shape of a generally perfect circle. When the measuring object 14 is at a short distance, by contrast, the saturated pixel section 41 of the light spot 39 shown in the upper part has a shape distorted from a perfect circle for such a reason as described above. The shape is determined by the condensing lens 16, and thus the light spot position can easily be determined from the shape of the saturated pixel section.

As described above, the light spot position can be detected even if the image data stored in the memory unit 25 greatly exceeds the saturation level. When the memory unit 25 is saturated on condition that constraint of a program for the control unit 28 makes it difficult to execute the control of suspending frames later than the frame in which the memory unit 25 is saturated, pixel data for the storage portions in the memory unit 25 which are saturated with stored values may be fixed at a saturation value and only pixel data for the other storage portions may be subjected to the processing of addition or subtraction.

Hereinbelow will be described a modification of processing of accumulating pixel data in the memory unit 25 by the control unit 28.

For control over storage portions saturated with pixel data in the memory unit 25 in the modification, subtraction of pixel data of signal light including disturbance light that is accumulated in the pixel section 31 and addition of pixel data of only disturbance light are executed in frames following the saturation in contrast to the addition of the former and the subtraction of the latter described with reference to FIGS. 6 and 7. For control over storage portions not saturated with pixel data, on the other hand, the addition of the former and the subtraction of the latter are executed as done ordinarily. By this operation, as shown in FIGS. 14(a) and 14(b), pixel data in the storage portions saturated with the pixel data is decreased every subsequent frame by a quantity of the signal light. For the storage portions not saturated with the pixel data, on the other hand, accumulation (addition) by the quantity of the signal light is executed as done ordinarily.

In the resultant profile of the intensity distribution of received light, as shown in lower parts of FIGS. 14(a) and 14(b), a profile of part thereof that exceeds the saturation level 32 is inverted with respect to the saturation level 32. Therefore, a position of a pixel having the maximum quantity of received light can accurately be detected from the pixel data stored in the memory unit 25. Thus more accurate distance measurement can be achieved, because the intensity distribution of received light of the part exceeding the saturation level is not abandoned, in comparison with the light spot position detection method described with reference to FIGS. 8(a) and 8(b) and based on the shape of the light spot or the intensity distribution of received light under the condition that pixel data stored in the memory unit 25 greatly exceeds the saturation level 32.

Figure 15A:
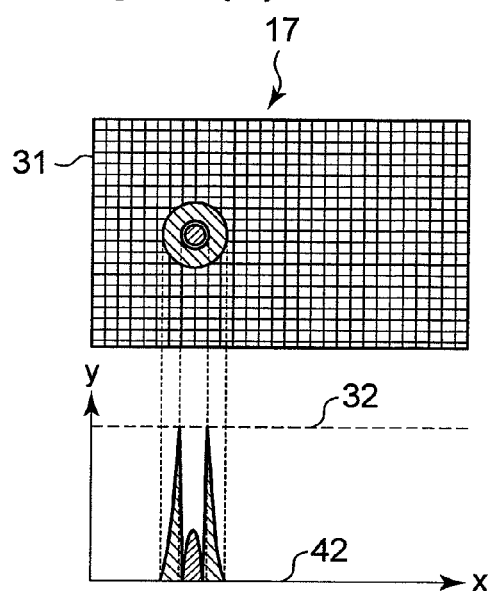
FIGS. 15(a) and 15(b) are diagrams showing states and intensity distributions of received light of light spots under a condition that pixel data for pixels exceeding the saturation level is inverted with respect to the saturation level and that pixel data for pixels that is lower than zero level is inverted with respect to the zero level.
Figure 15B:
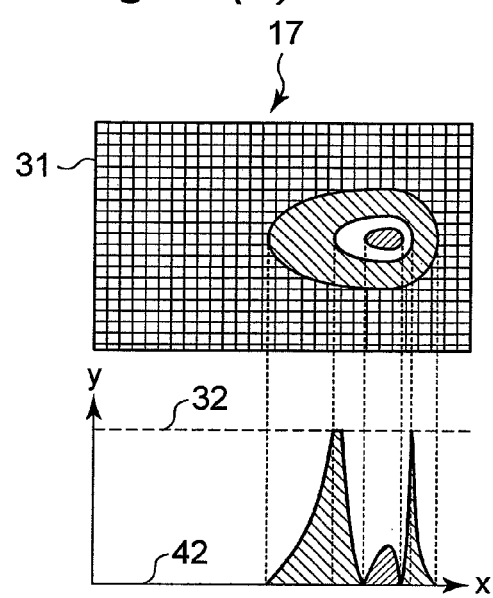

When the pixel data for the storage portions saturated with the pixel data in the memory unit 25 becomes zero as a result of the subtraction of the pixel data of the signal light including the disturbance light that is accumulated in the pixel section 31 and the addition of the pixel data of only the disturbance light contrary to the ordinary operation, the storage portions in which the pixel data has become zero undergo the addition of the pixel data of the signal light including the disturbance light that is accumulated in the pixel section 31 and the subtraction of the pixel data of only the disturbance light as done ordinarily. In the resultant intensity distribution of received light, as shown in lower parts of FIGS. 15(a) and 15(b), a profile of part thereof that exceeds the saturation level 32 is inverted with respect to the saturation level 32 and then a profile of part thereof that is lower than zero level 42 is inverted with respect to the zero level 42. Therefore, a position of a pixel having the maximum quantity of received light can accurately be detected from the pixel data stored in the memory unit 25. In the processing of accumulating pixel data in the memory unit 25, repeating the inversion on the saturation level 32 and the inversion on the zero level 42 makes it possible to detect light spots in a dynamic range that is infinitely wide in theory.

Hereinbelow will be described another modification of processing of accumulating pixel data in the memory unit 25 by the control unit 28.

The position of the light spot formed on the pixel section 31 of the solid-state image sensor 17 is shifted according to the distance to the measuring object 14 as described above. As shown in FIGS. 4(a) and 4(b), the light spot is positioned on the side of the pixel section 31 that is the nearer to the light emitting element 11, on condition that the distance is long, while the light spot is positioned on the side thereof that is the farther from the light emitting element 11, on condition that the distance is short. In the modification, a profile of intensity distribution of received light that exceeds the saturation level 32 of the memory unit 25 is obtained with use of the positional shift of the light spot on the pixel section 31 according to the distance to the measuring object 14 and with use of pixels on the pixel section 31 on which the reflected light is not incident.

Figure 16A:
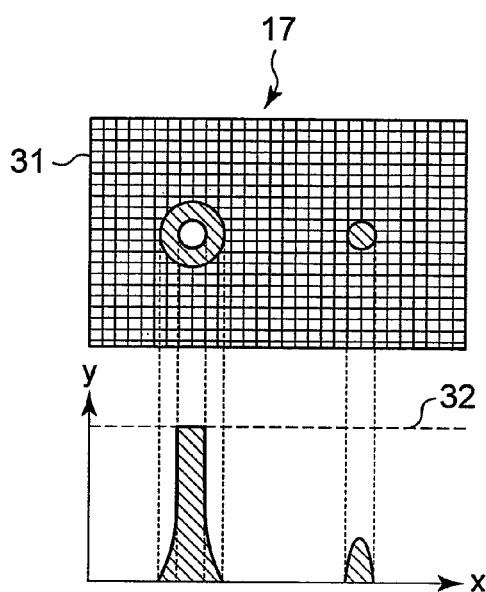
FIGS. 16(a) and 16(b) are diagrams showing states and intensity distributions of received light of light spots under a condition that part of pixel data which exceeds the saturation level is stored in an area expected to be stored with no pixel data.

When the measuring object 14 is at a long distance, specifically, as shown in FIG. 16(a), the reflected light is not incident on a right-side area on the pixel section 31 in the drawing, and thus a quantity of pixel data in storage portions of the memory unit 25 corresponding to the area remains to be zero even if the accumulation of the pixel data is repeated. When the control unit 28, in the modification, detects that a peak of the intensity distribution of received light has reached the saturation level 32 of the memory unit 25, the control unit 28 assigns the storage area having the quantity of pixel data remaining to be zero as an area (accumulation storage area) in which pixel data of pixels exceeding the saturation level 32 in the memory unit 25 is to be accumulated. As a result, subsequent pixel data of the pixels in which the peak of the intensity distribution of received light exceeds the saturation level 32 is accumulated in the accumulation storage area.

Figure 16B:
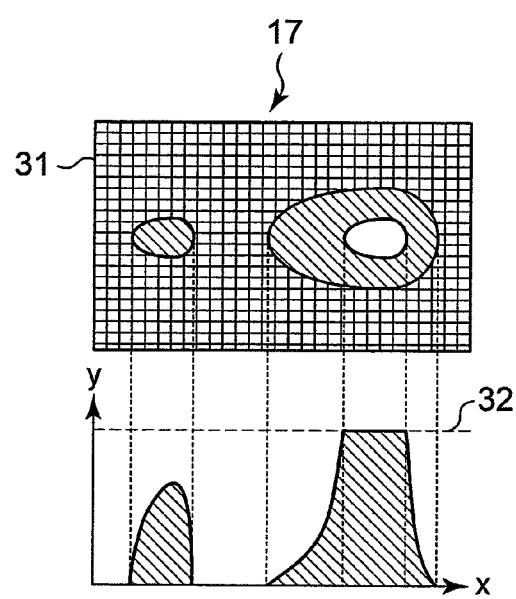
Figure 19:
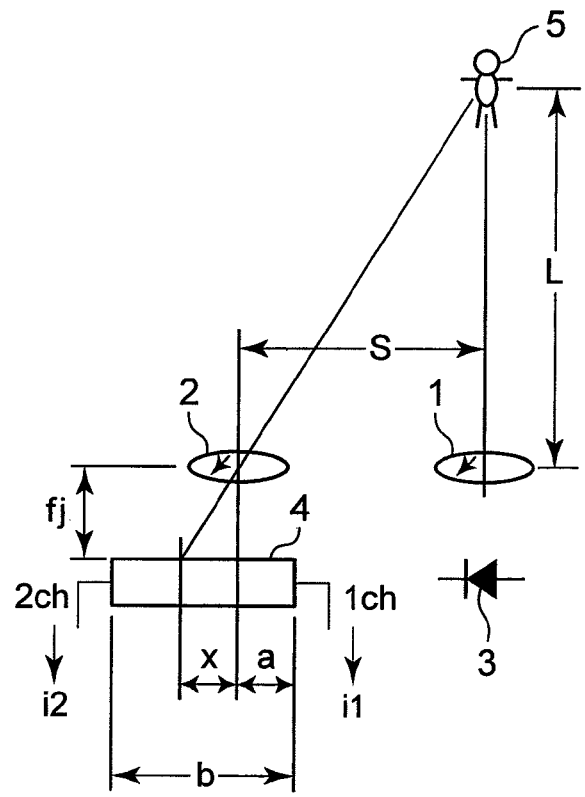
FIG. 19 is a diagram showing a schematic configuration of a conventional distance measuring device using a PSD.
Figure 20:
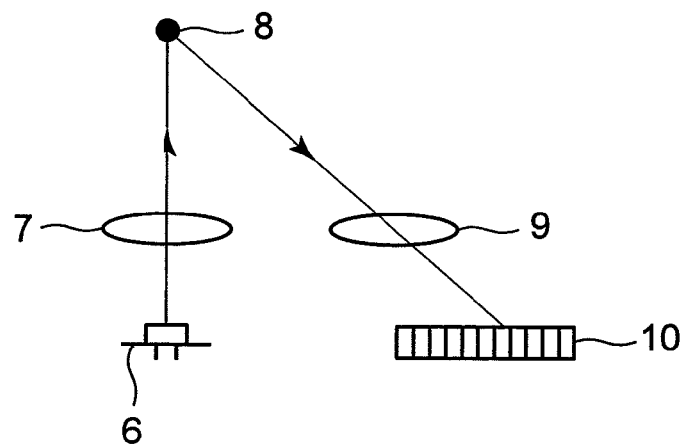
FIG. 20 is a diagram showing a schematic configuration of a conventional distance measuring device using a solid-state imaging device.

This operation makes it possible to obtain the profile of the intensity distribution of received light in the part exceeding the saturation level 32 as in FIGS. 14(a), 14(b), 15(a), and 15(b). Thus a position of a pixel having the maximum quantity of received light can accurately be detected from the pixel data stored in the memory unit 25, so that more accurate distance measurement can be achieved. FIG. 16(b) shows a state in which the measuring object 14 is at a short distance. The state is similar to that described above except that an area on the pixel section 31 on which reflected light is not incident is reversed left to right from FIG. 16(a).

In the embodiment, as described above, the frame operation is repeated through n frames, in which the signal light emitted from the light emitting element 11 and reflected by the measuring object 14 and the disturbance light are accumulated as electric charge in the pixel section 31 of the solid-state image sensor 17, in which the pixel data accumulated in the pixel section 31 is converted into digital values and added to the memory unit 25, in which the pixel data accumulated in the pixel section 31 is then cleared, in which only the disturbance light is accumulated in the pixel section 31 without activation of the light emitting element 11, in which the pixel data accumulated in the pixel section 31 is converted into digital values and subtracted from the memory unit 25, and in which the pixel data accumulated in the pixel section 31 is then cleared. In such a manner, only the pixel data for the signal light is accumulated in the memory part 25. Thus the position of the spot of the reflected light on the pixel section 31 can be detected with high accuracy even though the light spot position detection device of small size is used, even though the measuring object 14 is at a long distance, and/or even though the disturbance light is strong.

On condition that saturation with the pixel data stored in the memory unit 25 for any pixels on the pixel section 31 occurs, there are effected in the subsequent frames at least any one of suspension of light emission of the light emitting element 11, suspension of exposure of the solid-state image sensor 17, and suspension of transmission of pixel data to the memory unit 25. Accordingly, collapse of the profile of the intensity distribution of received light that is caused by the saturation with the pixel data can be minimized into one frame, and calculation of the light spot position based on the profile of the intensity distribution of received light can be achieved even if the memory unit 25 is saturated with pixel data. As a result, positions of light spots of incident light from distances from short to long can be detected. Besides, unnecessary accumulation of pixel data in the memory unit 25 is not performed, so that increase in the number of bits per storage portion in the memory unit can be prevented. In addition, wasteful power consumption can be reduced.

Furthermore, perfunctory execution of the subsequent frames for a predetermined period of time even after the saturation of the memory unit 25 makes the output timing of the result of the distance measurement uniform regardless of saturation or unsaturation of the memory unit and facilitates the control over the electronic equipment that is performed with capture of the output of the result of the distance measurement.

For only the pixels having caused saturation with the pixel data in the memory unit 25 in the modification, in the subsequent frames, the subtraction of the signal light including the disturbance light and the addition of the disturbance light are executed. In the intensity distribution of received light accumulated in the memory unit 25, in this manner, the profile of the part thereof exceeding the saturation level 32 is inverted with respect to the saturation level 32. When the pixel data for the storage portions saturated with the pixel data in the memory unit 25 becomes zero as a result of the subsequent subtraction of the signal light including the disturbance light and the subsequent addition of the disturbance light, the storage portions in which the pixel data has become zero undergoes the addition of the signal light including the disturbance light and the subtraction of the disturbance light. In the resultant intensity distribution of received light based on the pixel data accumulated in the memory unit 25, in this manner, the profile of the part thereof that exceeds the saturation level 32 is inverted with respect to the saturation level 32 and then the profile of the part thereof that is lower than the zero level 42 is inverted with respect to the zero level 42. Therefore, the intensity distributions of received light in the part exceeding the saturation level 32 and in the part lower than the zero level 42 can be held with the profiles thereof inverted with respect to the saturation level 32 and the zero level 42, and accurate distance measurement can be achieved on basis of the inverted profiles of the intensity distributions of received light.

In another modification, when the peak of the intensity distribution of received light exceeds the saturation level 32 of the memory unit 25, the area stored with no pixel data is assigned, in the subsequent frames, as the accumulation storage area in which the pixel data of the storage portions exceeding the saturation level 32 in the memory unit 25 is accumulated. Thus the pixel data in the storage portions in which the peak of the intensity distribution of received light has reached the saturation level 32 is accumulated in the accumulation storage area in the subsequent frames. Accordingly, the profile of the intensity distribution of received light in the part exceeding the saturation level 32 can be obtained, so that the position of the pixel having the maximum quantity of received light can accurately be detected from the pixel data stored in the memory unit 25, and so that more accurate distance measurement can be achieved.

For the embodiment, there has been described the light spot position detecting device of the invention that is applied to the optical distance measuring device of reflection type shown in FIG. 1. The invention, however, is not limited thereto, but may be applied to the optical direction detecting device shown in FIG. 2 so as to identify the direction in which the measuring object 19 exists. The invention may be applied to the light source direction detecting device shown in FIG. 3 so that the direction in which the light emitting element 21 exists can be identified.

Second Embodiment

For the embodiment, the light spot position detecting device will be described with reference to an example in which the device is applied to the optical distance measuring device of reflection type shown in FIG. 1, as in the first embodiment. A configuration of the optical distance measuring device is the same as that of the optical distance measuring device shown in FIG. 1, and the description below will be given with use of FIG. 1.

FIGS. 17(a) and 17(b) are diagrams for illustrating a method for exposing the pixel section 31 in the solid-state image sensor 17 of the embodiment. FIGS. 18(a) through 18(d) show operation timing charts of the optical distance measuring device in which the light spot position detection device is installed.

In the first embodiment, all the pixels in the pixel section 31 are simultaneously exposed to light when signal light that is emitted from the light emitting element 11 and reflected by the measuring object 14 and that includes disturbance light and only the disturbance light are converted into electric charge by the pixel section 31 of the solid-state image sensor 17 and accumulated.

In the embodiment, by contrast, different pixels in the pixel section 31 are exposed between the accumulation of the signal light including the disturbance light in the pixel section 31 and the accumulation of only the disturbance light in the pixel section 31. Hereinbelow, a specific description will be done with reference to an example of the exposing method shown in FIG. 17(a).

With timing (a) as shown in FIG. 18(a), initially, the shutter of the solid-state image sensor 17 is opened as shown in FIG. 18(b) in synchronization with light emission of the light emitting element 11 so that exposure is carried out, as in the first embodiment. In the embodiment, on this occasion, only pixels shown by hatching and arranged in rows having even (or odd) ordinal numbers from top in FIG. 17(a) are exposed to light. As shown in FIG. 18(b), subsequently, pixels not hatched and arranged in rows having odd (or even) ordinal numbers from top in FIG. 17(a) are exposed to light with timing (b) when the light emitting element 11 is not activated. Thus detection of the signal light including the disturbance light and detection of only the disturbance light are performed by the different pixel rows.

With timing (c) shown in FIG. 18(c), subsequently, pixel data accumulated in the pixel section 31 is subjected to A/D conversion by the A/D converting unit 26 and is transmitted and added into the memory unit 25. In FIG. 17(a), in this operation, pixel data of "the pixels used for detection of only the disturbance light" is subtracted from pixel data of "the pixels used for detection of the signal light including the disturbance light," which pixels adjoin each other and form pairs in a direction (e.g., (pixel data of a pixel (row B, column 01))-(pixel data of a pixel (row A, column 01)), (pixel data of a pixel (row B, column 02))-(pixel data of a pixel (row A, column 02)), . . . (pixel data of a pixel (row D, column 01))-(pixel data of a pixel (row C, column 01)), . . . ). The values resulting from the subtraction are transmitted and added to the corresponding storage portions in the memory unit 25.

In configurations of the solid-state image sensor 17, the memory unit 25, and the control unit 28 that allow the processing of transmission and addition of pixel data as described above, it is unnecessary to provide the memory unit 25 with storage portions of which the number corresponds to that of all the pixels in the pixel section 31 and it is thus sufficient to provide one storage portion for the paired two pixels. This allows a capacity of the whole memory unit 25 to be halved. As shown in FIG. 18(c), readout signal has only to be outputted one time in each frame from the pixel section 31 to the memory unit 25. As a result, power consumption of the light spot position detection device can be reduced.

There is a fear that to halve the number of the storage portions in the memory unit 25 as described above may result in decrease in resolving power for the light spot position on the pixel section 31. The position of the light spot on the pixel section 31, however, is shifted in a direction of one dimension according to the change in the distance to the measuring object 14 as shown in FIGS. 1 and 4(a)(b). The direction in FIG. 17(a) is a left-right direction, for example. Provided that the adjoining two pixels to be paired are selected along a direction orthogonal to the direction of the shift of the light spot position, e.g., a vertical direction in FIG. 17(a), the shift of the light spot position caused by the change in the distance to the measuring object 14 causes no skip of pixels and no reduction in the resolving power.

Though the above description on the exposing method for the pixel section 31 has been given with reference to the example of the exposing method shown in FIG. 17(a), the invention is not limited thereto.

That is, the exposure may be performed so that pixels for detecting the signal light including the disturbance light and pixels for detecting only the disturbance light, in an arrangement of the pixels in the pixel section 31, form a checkered pattern as shown in FIG. 17(b). In the arrangement, as in FIG. 17(a), pixel data of "pixels used for detection of only the disturbance light" is subtracted from pixel data of "pixels used for detection of the signal light including the disturbance light," which pixels adjoin each other in a direction and form pairs. Specifically, the subtraction is carried out as follows: (pixel data of a pixel (row A, column 01))-(pixel data of a pixel (row B, column 02)), (pixel data of a pixel (row B, column 02))-(pixel data of a pixel (row A, column 02)), . . . (pixel data of a pixel (row C, column 01))-(pixel data of a pixel (row D, column 01)), . . . ). The values resulting from the subtraction are transmitted and added to the corresponding storage portions in the memory unit 25.

In FIG. 17(b), similarly, the position of the light spot on the pixel section 31 is shifted in a direction of one dimension according to change in the distance to the measuring object 14. The direction in FIG. 17(b) is a left-right direction. Provided that the adjoining two pixels to be paired are selected along a direction orthogonal to the direction of the shift of the light spot position, i.e., a vertical direction in FIG. 17(b), the shift of the light spot position caused by the change in the distance to the measuring object 14 causes no skip of pixels and no reduction in the resolving power. It is needless to say that the adjoining two pixels to be paired are selected along the left-right direction in FIG. 17(b) on condition that the position of the light spot is shifted in the vertical direction in FIG. 17(b).

In the embodiment, as described above, the pixels arranged in a matrix on the pixel section 31 of the solid-state image sensor 17 are classified into "first pixels for detecting the signal light including the disturbance light" and "second pixels for detecting only the disturbance light," which pixels adjoin each other in the one direction and form the pairs. The first pixels are exposed in synchronization with the timing of the light emission of the light emitting element 11, and the second pixels are exposed with the timing without the light emission from the light emitting element 11. Then the digital values of the pixel data obtained from the subtraction of the pixel data accumulated in the second pixels from the pixel data accumulated in the first pixels are stored in the storage portions in the memory unit 25 each of which units corresponds to each of the pairs of the pixels.

It is therefore unnecessary to provide the memory unit 25 with the storage portions of which the number corresponds to that of all the pixels in the pixel section 31, so that the capacity of the whole memory unit 25 can be halved. Besides, the readout signal has only to be outputted one time in each frame from the pixel section 31 to the memory unit 25, and thus power consumption of the light spot position detection device can be reduced.

In the embodiment, as in the first embodiment, it is needless to say that the accumulation of only the pixel data for the signal light in the memory part 25 with repetition of the frame operation described above through n frames makes it possible to accurately detect the position of the spot of the reflected light on the pixel section 31 even though the light spot position detection device of small size is used, even though the measuring object 14 is at a long distance, and/or even though the disturbance light is strong.

On condition that saturation with the pixel data stored in the memory unit 25 occurs, as in the first embodiment, there are effected in the subsequent frames, at least any one of suspension of light emission of the light emitting element 11, suspension of exposure of the solid-state image sensor 17, and suspension of transmission of pixel data to the memory unit 25. Thus collapse of a profile of intensity distribution of received light that is caused by the saturation with the pixel data can be minimized into one frame, and calculation of the light spot position based on the profile of the intensity distribution of received light can be achieved even if the memory unit 25 is saturated with the pixel data.

It is effective to apply the light spot position detecting devices of the embodiments to optical distance measuring devices, optical direction detecting device, light source direction detecting devices and the like, as described above. Furthermore, the use of the solid-state image sensor 17 therein allows reduction in size of the devices, and the devices applied to the optical distance measuring devices are suitable for being installed in portable telephones with cameras, digital cameras, and the like, for example, in order to provide values of measured distances for auto focusing. The devices applied to the optical direction detecting devices are suitable for being installed in liquid crystal displays and the like, for example, in order to perform on/off control over power source of monitor with detection of presence or absence of human. The devices applied to the light source direction detecting devices are suitable for identifying angle, position and the like of a remote control (light source) for air-conditioning equipment, video equipment or the like, for example, in order to control the equipment in accordance with optimal conditions with respect to the direction of the light source.

The saturation level 32 of the memory unit 25 in the embodiments does not have to be the largest bits that causes complete saturation of the storage portions with pixel data but may safely be a threshold value that is set to be smaller by an appropriate number of bits than the largest bits. In such a configuration, it is convenient to set the saturation level 32 at a value that prevents the disturbance light component from causing image data to exceed the largest bits of the storage portions when the image data is stored in the memory unit 25 with one light emitting operation of the light emitting element 11.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE SIGNS LIST 11, 21: light emitting element
12: emission lens
13, 18, 22: pencil of emitted light
14, 19: measuring object
15, 20: pencil of reflected light
16, 23: condensing lens
17, 24: solid-state image sensor
25: memory unit
26: A/D converting unit
27: processor unit
28: control unit
31: pixel section
32: saturation level
33, 34, 36, 37, 38, 39: light spot
40, 41: saturated pixel section
42: zero level

The invention claimed is:

1. A light spot position detection device comprising:
a light emitting element,
a condensing lens for condensing a pencil of light emitted from the light emitting element or a pencil of light resulting from reflection of the pencil of light by an object;
a solid-state image sensor on which a light spot is formed by the pencil of light or pencil of reflected light condensed by the condensing lens,
a pixel section that is provided in the solid-state image sensor and that includes pixels for detecting the light spot and performing conversion into pixel data corresponding to a quantity of received light,
a digital converting unit for converting the pixel data of the pixels in the pixel section into digital values,
a memory unit for storing the pixel data, converted into the digital values by the digital converting unit, into storage portions corresponding to the respective pixels of the pixel section,
a processor unit for computing a position of the light spot on the pixel section on basis of the digital pixel data stored in the memory unit, and
a control unit for controlling the light emitting element, the solid-state image sensor, the memory unit, and the processor unit, and thereby detecting the position of the light spot formed on the solid-state image sensor, wherein
a frame of operation to be performed by the control unit includes:

controlling the light emitting element so as to effect light emission thereof for a specified period of time;

controlling the solid-state image sensor so as to effect exposure thereof to light for the specified period of time in synchronization with the light emission of the light emitting element or asynchronously to the light emission of the light emitting element; and controlling the solid-state image sensor and the memory unit so as to add pixel data of the pixels, obtained in the pixel section in the exposure of the solid-state image sensor for the specified period of time in synchronization with the light emission of the light emitting element, to the corresponding storage portions in the memory unit and so as to subtract pixel data of the pixels, obtained in the pixel section in the exposure of the solid-state image sensor for the specified period of time asynchronous to the light emission of the light emitting element, from the corresponding storage portions in the memory unit, and thereby storing the storage portions with pixel data of only signal light composed of the light emitted from the light emitting element or the reflected light resulting from the reflection of the light by the object, and the control unit controls the light emitting element, the solid-state image sensor and the memory unit so as to repetitively perform a given number of the frames of operation to accumulate the pixel data of only the signal light in the storage portions in the memory unit, the control unit controls the processor unit so that the processor unit calculates the position of the light spot on the pixel section on basis of the pixel data of only the signal light accumulated and stored in the storage portions in the memory unit, and the control unit thereby derives output of positional information on the light spot for the given number of frames whether the storage portions in the memory unit are saturated or not with the pixel data.

2. The light spot position detection device as claimed in claim 1, wherein the control unit controls the solid-state image sensor and the memory unit so as not to perform the addition to and the subtraction from the storage portions in the memory unit in frames following the saturation of any of the storage portions in the memory unit with the pixel data of the signal light and holds the pixel data in the storage portions in the saturated state.

3. The light spot position detection device as claimed in claim 1, wherein the control unit controls the solid-state image sensor so as not to perform the exposure of the solid-state image sensor in frames following the saturation of any of the storage portions in the memory unit with the pixel data of the signal light.

4. The light spot position detection device as claimed in claim 1, wherein the control unit controls the light emitting element so as to suspend the light emission of the light emitting element in frames following the saturation of any of the storage portions in the memory unit with the pixel data of the signal light.

5. The light spot position detection device as claimed in claim 2, wherein the processor unit is arranged and configured such that the processor unit finds a profile of intensity distribution of received light around pixels of the pixel section corresponding to the storage portions saturated with the pixel data of the signal light on basis of pixel data of storage portions positioned around the saturated storage portions in the memory unit and computes the position of the light spot on the pixel section with use of the profile of the intensity distribution of received light.

6. The light spot position detection device as claimed in claim 2, wherein the processor unit is arranged and configured such that the processor unit finds a shape in plan of an aggregate of pixels of the pixel section corresponding to the storage portions saturated with the pixel data of the signal light on basis of the saturated storage portions in the memory unit and computes the position of the light spot on the pixel section with use of the shape in plan.

7. The light spot position detection device as claimed in claim 1, wherein the control unit controls the solid-state image sensor and the memory unit so as to perform subtraction of pixel data of pixels of the pixel section corresponding to the saturated storage portions, which data is obtained in the pixel section in the exposure of the solid-state image sensor for the specified period of time in synchronization with the light emission of the light emitting element, from the corresponding storage portions in the memory unit and so as to perform addition of pixel data of the pixels, which data is obtained in the pixel section in the exposure of the solid-state image sensor for the specified period of time asynchronous to the light emission of the light emitting element, to the corresponding storage portions in the memory unit, on condition that the storage portions in the memory unit are saturated with the pixel data of the signal light.

8. The light spot position detection device as claimed in claim 7, wherein, on condition that the pixel data stored in the storage portions in the memory unit becomes zero with the subtraction of the pixel data, in the exposure of the solid-state image sensor in synchronization with the light emission of the light emitting element, from the storage portions in the memory unit and with the addition of the pixel data, in the exposure of the solid-state image sensor asynchronous to the light emission of the light emitting element, to the storage portions in the memory unit, the control unit controls the solid-state image sensor and the memory unit so as to perform addition of pixel data of pixels of the pixel section corresponding to the storage portions of zero data, which pixel data is obtained in the pixel section in the exposure of the solid-state image sensor for the specified period of time in synchronization with the light emission of the light emitting element, to the corresponding storage portions in the memory unit, and so as to perform subtraction of pixel data of the pixels, which pixel data is obtained in the pixel section in the exposure of the solid-state image sensor for the specified period of time asynchronous to the light emission of the light emitting element, from the corresponding storage portions in the memory unit.

9. The light spot position detection device as claimed in claim 1, wherein on condition that a storage portion in the memory unit is saturated with the pixel data of the signal light, the control unit controls the solid-state image sensor and the memory unit so as to store pixel data, which is to be stored in the saturated storage portion, in a storage portion in the memory unit corresponding to a pixel in an area of the pixel section where the light spot is not formed.

10. The light spot position detection device as claimed in claim 1, wherein
the control unit, in one frame, controls the exposing operation of the solid-state image sensor such that first pixels to be exposed in synchronization with the light emission of the light emitting element and second pixels to be exposed asynchronously to the light emission of the light emitting element differ from each other, and that the first pixels adjoin respective ones of the second pixels in a direction and the adjoining pixels form pairs in positional relation, and controls image data storage operation performed by the solid-state image sensor and the memory unit so as to store a result of subtraction of pixel data in the second pixels from pixel data in the first pixels into the corresponding storage portions in the memory unit so that operation of storing image data into the memory unit is performed at a time in one frame.

11. An optical device comprising:
the light spot position detection device as claimed in claim 1, and
a positional information calculating unit for calculating positional information including a distance and a direction concerning the object or the light emitting element on basis of the position of the light spot on the pixel section that is calculated by the processor unit.

12. Electronic equipment comprising the optical device as claimed in claim 11.

* * * * *